April 28, 1970   J. KELL   3,508,720
SAFETY BELTS

Filed March 18, 1968   5 Sheets-Sheet 1

April 28, 1970    J. KELL    3,508,720
SAFETY BELTS
Filed March 18, 1968    5 Sheets-Sheet 4

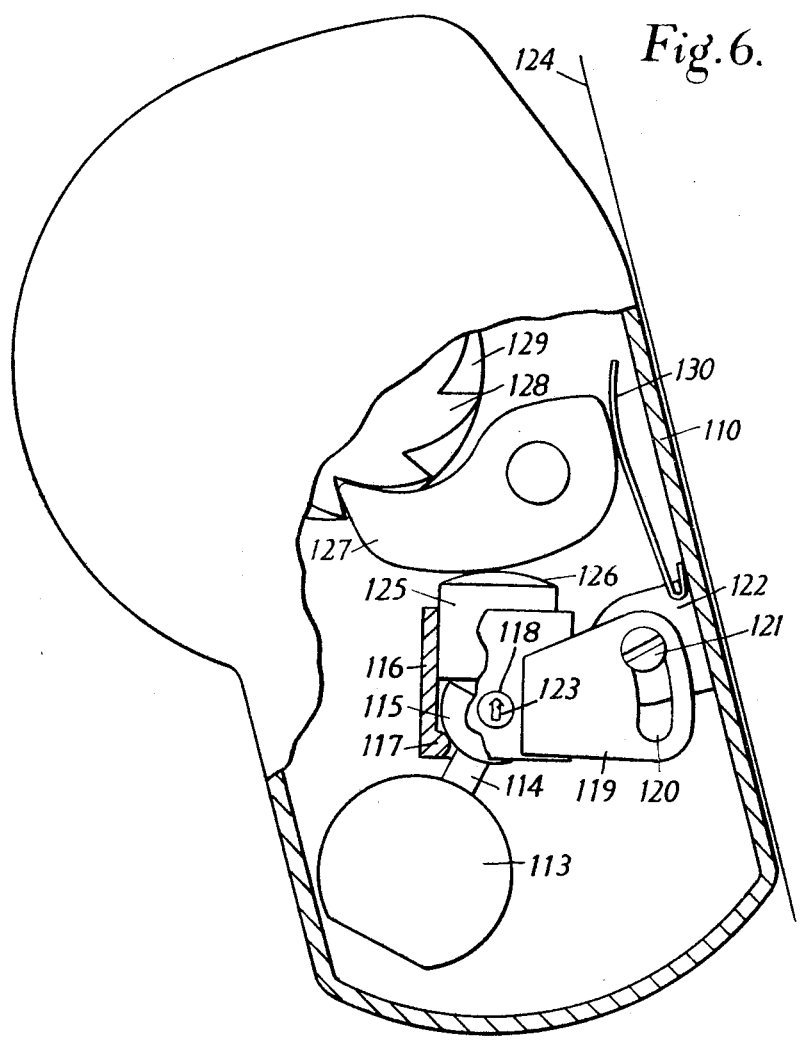

United States Patent Office 3,508,720
Patented Apr. 28, 1970

3,508,720
SAFETY BELTS
John Kell, Carlisle, Cumberland, England, assignor to Kangol Magnet Limited, Carlisle, Cumberland, England, a British company
Filed Mar. 18, 1968, Ser. No. 713,804
Claims priority, application Great Britain, Mar. 21, 1967, 13,291/67
Int. Cl. B65h 75/48
U.S. Cl. 242—107.4                5 Claims

ABSTRACT OF THE DISCLOSURE

A pendulum-operated vehicle-sensitive inertia reel device has its pendulum suspended by means of a hemispherical member mounted on the top of the stem of the pendulum with its curved surface confronting the pendulum bob. This hemispherical member rests in the socket. When the pendulum is displaced from the vertical, the resulting upward movement of the edge of the plane upper surface of the pendulum causes a pawl to move into engagement with a ratchet wheel on the reel.

---

The present invention relates to safety belts of the kind which are now increasingly being used on motor vehicles, and is more particularly concerned with a mechanism of the so-called inertia reel type for use therewith. Equipment of this type is arranged so that the belt is normally held in position around the body of the wearer by spring tension which can be adjusted to permit largely unrestricted movement of the body. If, however, the need arises for the belt to obtain a firm purchase, as would happen if the vehicle decelerated very rapidly, the paying-out of the belt is prevented and it therefore serves its intended purpose by maintaining the wearer in his seat.

Belts of this type may operate on either of two principles. According to one of these, the locking action is produced by a snatch on the belt so that locking takes place due to a voluntary movement if sufficiently rapid; this may be referred to as a strap-sensitive locking action. According to the other principle, a separate control is provided in the form of a pendulum or other inertia mechanism and the locking of the belt is effected by the inclination of the pendulum due to the movement of the vehicle. In this case, movement of the wearer of the belt, even if sudden, will not produce locking, but the imposition of any sufficient force to move the pendulum out of its normal vertical position causes locking; this may be referred to as a vehicle-sensitive locking action.

The present invention is concerned with an inertia reel device operating on the latter principle. The invention relates to an improved vehicle-sensitive locking action, which may however be incorporated in an inertia reel mechanism also involving a strap-sensitive locking action, for example of the kind disclosed in our copending application No. 713,803, now abandoned, so giving both kinds of protection.

A chief object of the invention is to provide a vehicle-sensitive device which is actuated by an inertia member so as to provide locking of a safety belt, for instance, the shoulder portion of a lap and diagonal belt, on change of speed of the vehicle. When the belt is being worn therefore, the inertia reel is unlocked normally so as to allow free movement by the wearer, for instance so as to lean forward or sideways in the car. The locking effect takes place however, if there is any sudden linear acceleration of deceleration of the vehicle or if the inertia member is otherwise moved from its normal position, for instance, by lateral forces when the vehicle is following a curved course.

According to the invention, an inertia reel device includes a reel having a ratchet wheel mounted thereon for rotation therewith, a pendulum so mounted that it can pivot at least through a limited angle in all directions about a pivot point, an operating member secured to the pendulum and having a top surface arranged to engage with a bottom surface of a thrust transmission member which is mounted for movement in a direction which, when the device is mounted for use, is vertical, the top surface of the operating member and the bottom surface of the thrust transmitting member being so shaped that angular displacement of the pendulum from such vertical direction causes upward movement of the thrust transmission member, such upward movement being arranged to cause a pawl to move into engagement with the ratchet wheel.

In order that the invention may be readily understood, preferred embodiments are described below in conjunction with the accompanying drawings, in which:

FIG. 6 is a partially broken-away elevational view of the embodiment shown in FIG. 5 mounted on a surface sloping in the opposite direction to that of FIG. 5 and with its pendulum deflected from the vertical into a locking position.

Figure 1:
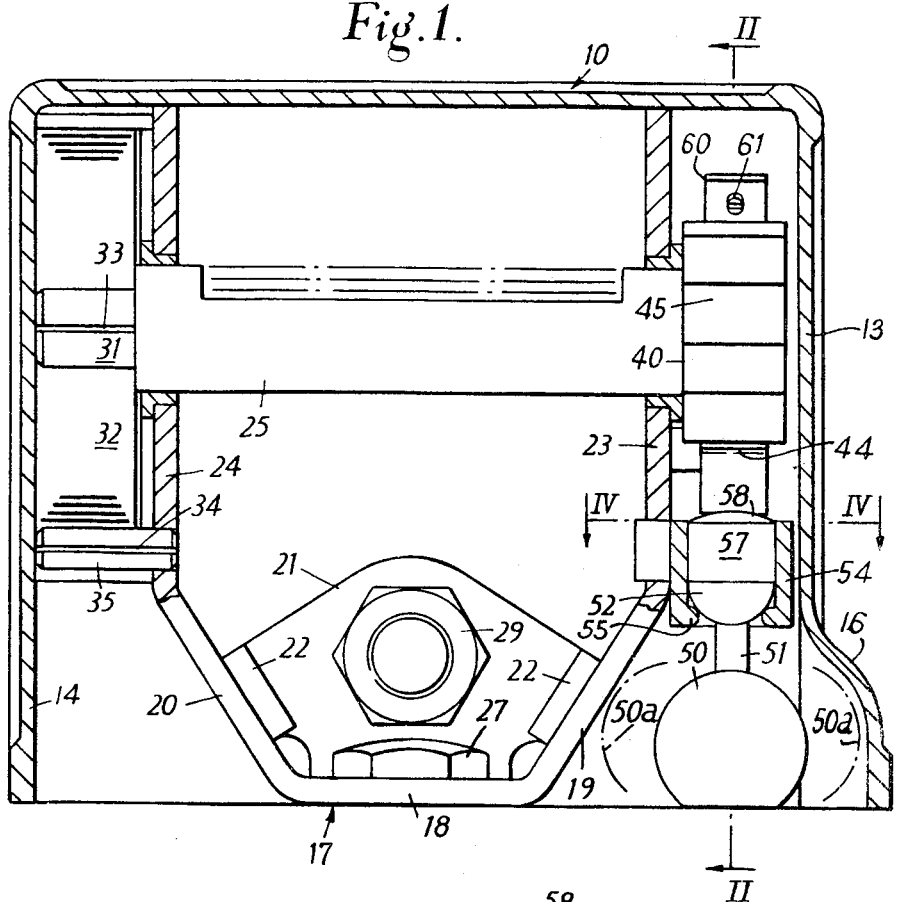
FIG. 1 shows the main components of an inertia reel mechanism in vertical section.
Figure 2:
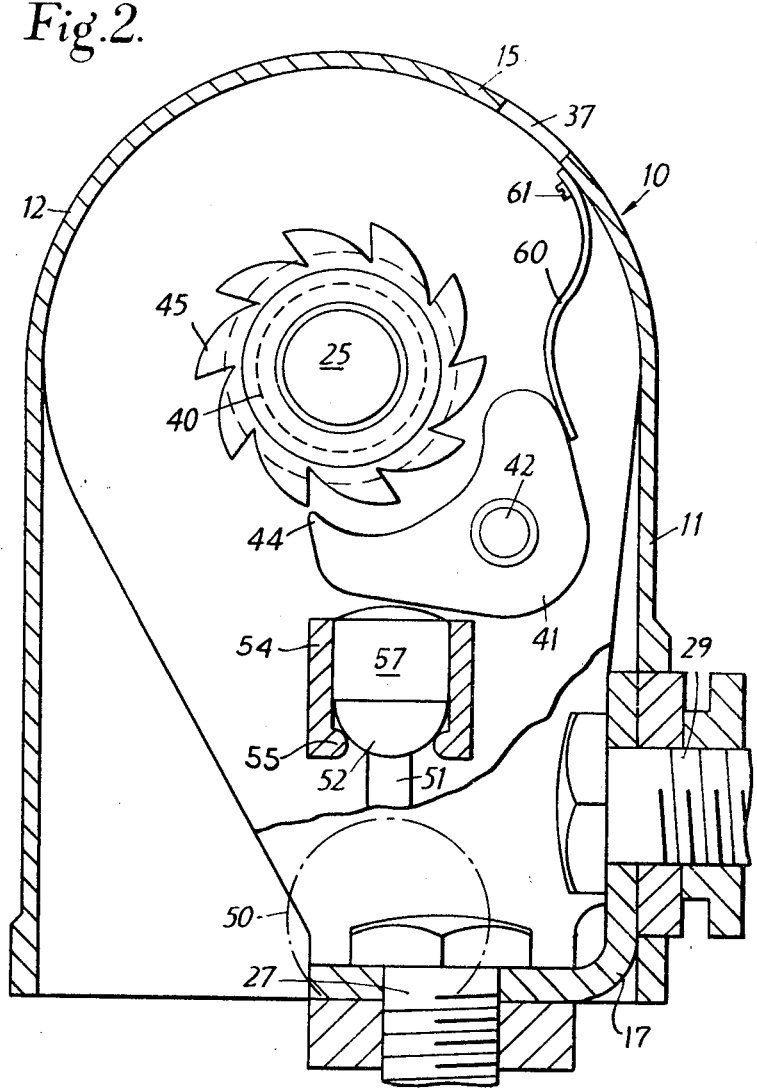
FIG. 2 shows an end elevation of the inertia reel mechanism taken on the line II—II of FIG. 1.

Referring to FIGS. 1 and 2, the device includes a main housing shown generally at 10. This housing 10 consists of a generally rectangular casing having upright side walls 11, 12, upright end walls 13, 14 and a half cylindrical top wall 15. A lateral extension is formed as shown at 16 in one end wall 13 to house the inertia member, as described in more detail below.

Figure 3:
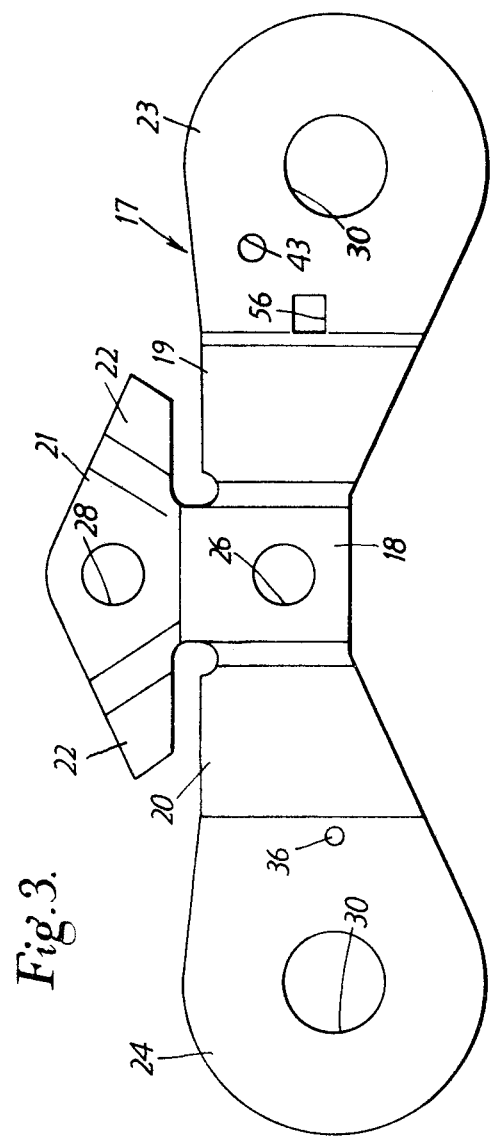
FIG. 3 shows, in flat form, a main pressing for a housing of the inertia reel mechanism of FIGS. 1 and 2, before being assembled by appropriate bending operations.

Within the housing 10, a sub-housing 17 is mounted. This sub-housing 17 is shown in part manufactured condition in FIG. 3. This consists of a small rectangular base member 18 having upwardly and downwardly inclined side limbs 19, 20 extending from two of its opposite sides. A pentagonal support member 21 is integral with a third side of the base 18 and is formed with two lug members 22 which are bent inwardly at right angles to the pentagonal portion 21 and are located inside the respective wall elements 19, 20. These parts of the sub-housing thus form a very strong and rigid base. From the upper edges of the side wall elements 19, 20, extend side webs 23, 24 which are housed within the upper part of the main housing 10 and form the main support for the inertia reel spindle 25. A mounting hole 26 is formed centrally of the base 18 by which the device may be secured for instance, by a bolt 27 to a horizontal surface and a second main hole 28 is formed in the pentagonal member 21 by which the device may be secured, for instance, by means of a bolt 29 to a vertical surface.

Within the housing 10, the spindle 25 is supported in bearing apertures 30 formed in the side webs 23, 24 and at one end of the housing 10, a spigot 31 projecting from the spindle 25 houses the rewind spring 32 for the reel. The inner end of the spring 32 is secured in a radial slot 33 in the spigot 31 and its outer end is secured in a slot 34 formed in a pin 35 firmly mounted in an aperture 36 in the side web 24 of the sub-housing 17. The dome portion 15 of the housing 10 includes a slot 37 for passage of the shoulder element of the safety belt into the housing. The inner end of the belt is secured in known manner to the inertia reel spindle 25.

At its opposite end, the spindle 25 carries a strong ratchet wheel 40 (FIG. 2). This is associated with a locking pawl 41 mounted upon a spindle 42 which is housed in an aperture 43 formed in the side web 23 of the sub-housing 17. The pawl has a nosepiece 44 which can pivot into the path of movement of the gear teeth 41 formed on the ratchet wheel 40. The pawl 41 is shaped so that, in its normal position, it rests with the nosepiece 44 out of the path of movement of the teeth 45.

As previously mentioned, the end wall 13 of the housing 10 includes a lateral extension 16 which provides an increased space for an inertia member. This consists of a weight 50 made, for instance, of lead. The lead weight 50 forms the bob of a pendulum being secured to a dependent rod 51 carrying at its upper end a hemispherical mounting member 52. The range of movement of the weight 50 is indicated in dotted lines at 50a. The mounting member 52 has a flat circular upper face and a hemispherical lower face and is supported by the latter face in a socket 54 in the form of vertical cylinder. Around its inner lower periphery, the socket 54 includes an integral projection 55 which forms line contact with the mounting member 52. The mounting member 52 and the inner bore of the socket 54 have the same radius. The socket 54 includes an integral support projection 55 by which the socket 54 is mounted beneath the pawl 41, the projection 55 lodging in a rectangular aperture 56 formed in the side web 23 of the sub-housing 17. A cylindrical plunger 57 having a flat lower surface and a crowned upper surface 58 is mounted for free vertical sliding movement within the top of the socket 54 above the mounting member 52.

In the normal position, the crowned upper surface 58 is beneath a lower surface of the pawl 41 on the part carrying the nosepiece 44 and when the pawl is in its normal position and the pendulum is hanging freely vertical, a small clearance is left between the surface 58 and the pawl 41 as can be best seen in FIG. 2. When the parts are in this position, that is, when the vehicle is stationary upon a horizontal surface or when no lateral forces act upon the pendulum weight 50, the flat surface of the mounting member 52 and the plunger 57 are in face-to-face contact.

Any lateral force imposed on the weight 50 causes the pendulum to swing and it pivots about the centre of the flat upper face of the mounting member 52. When this occurs, the plunger 57 rises on the uppermost part of the periphery of the flat upper face and contacts the inside of the pawl 41 and therefore moves the nosepiece 44 into engagement with one of the teeth of the ratchet wheel 40 so that such wheel is locked against rotational movement. The reel is therefore held firmly locked against unwinding.

Figure 4:
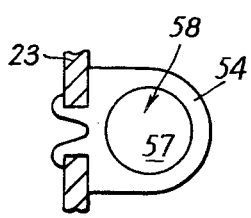
FIG. 4 shows a detailed view taken on the line IV—IV of FIG. 1.

The vehicle-sensitive locking effect is provided by relatively simple means and the necessary free pivotation of the weight 50 and movement of the plunger 57 can be obtained by an appropriate choice of materials. For instance, the lead weight 50 can be secured to the rod 51 and mounting member 52 which can consist of a single or two separate components of, for example, steel. The plunger 57 can also be of steel. The cylinder 54 which is shown in detail in FIG. 4 can be compression moulded from nylon for instance, or polytetrafluoroethylene.

In order to ensure that the pawl 41 is normally maintained so that its nosepiece 44 lies outside the path of movement of the gearwheel teeth 45, a leaf spring 60 acts upon the side of the projection 46, where this is provided. As shown in FIG. 2, the lead spring is secured by a grub-screw 61, for instance, to the inside of the housing 10 and its free end lies against the projection 46. The method of mounting of the spring can be arranged to provide very sensitive adjustment of the pawl 41, for instance, by curving the leaf spring adjacent the grub-screw 61. The spring can be secured to the pawl 41 if desired.

Figure 5:
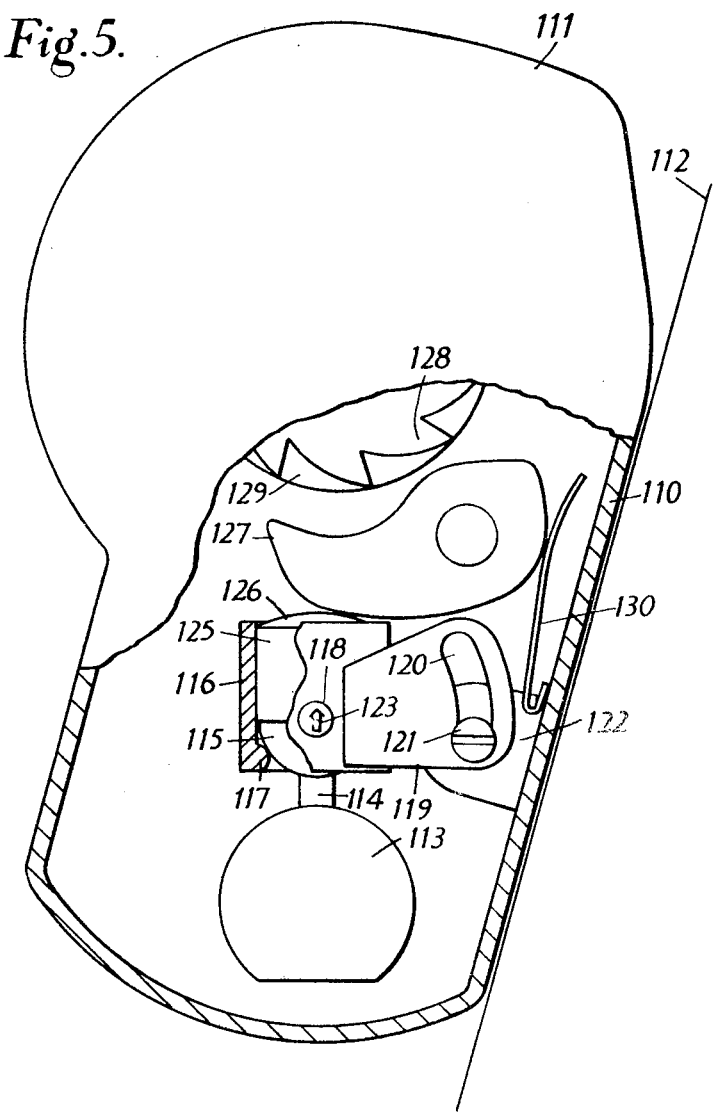
FIG. 5 is a partially broken-away elevational view of another embodiment of the invention mounted on a sloping surface with its pendulum vertical.

Referring now to FIG. 5, which shows an alternative embodiment of the invention, a mounting plate 110, which forms one of the side walls of a housing 111, is mounted on an included surface 112 (e.g. the inside of a box-section door sill) by means of bolts (not shown). A pendulum, comprising a bob 113 attached by a shaft 114 to a hemisphere 115 which has its flat flat surface uppermost, is suspended from a mounting comprising a hollow cylinder 116, the internal diameter of which is equal to the diameter of the hemisphere. A lip 117 is formed on the inside of the cylinder at the bottom thereof. This engages with the hemisphere 115 to pivotally support the pendulum.

The cylinder 116 is pivotally mounted on a horizontal shaft 118 which is disposed parallel to the surface 112 on which the plate 110 is mounted.

A clamping lever 119 extends radially from the shaft 118 towards the plate 110. An arcuate slot 120 is provided at the outer end of the clamping lever 119 and a screw 121 extends through this slot into a lug 122 which is secured to the mounting plate 110. When the screw 121 is tightened, the lever 119 is clamped securely to the lug 122 and pivotal movement of the cylinder 16 is prevented.

An arrow 123 is engraved on the shaft 18 parallel to the axis of the cylinder 116. The shaft of the arrow 123 is in the form of a screw or coin slot and the arrow 123 thus serves both as an indication of the orientation of the cylinder 116 and as a means for altering such orientation of the 116 and as a means for altering such orientation.

The flat top of the hemisphere 115 supports a cylinder 125 which is coaxially disposed in the cylinder 116 and has a domed top surface 126. A pawl 127 is biased onto contact with the surface 126 by means of a spring 130 and away from a ratchet wheel 128 carried by a reel 129 on which the harness strap is wound.

FIG. 6 shows the plate 110 secured to a surface 124 which is inclined in the opposite direction to the surface 112. Consequently the cylinder 116 has been turned so that the screw 121 is near the other end of the slot 120.

FIG. 6 also shows the pendulum bob 113 deflected as it would be if the unit were accelerated in the left-to-right direction as shown in the drawing. Tilting of the hemisphere 115 has caused upward movement of the cylinder 125. The domed top 126 of the cylinder 125 has forced the pawl 127 into engagement with a ratchet 128.

It will be observed that, in both embodiments, the ratchet teeth are so shaped that when the pawl engages therewith the outer end of one of the ratchet teeth overlies the tip of the pawl. As a result of this, the locked condition persists until tension is removed from the harness strap.

I claim:
1. An inertia device comprising a reel, a ratchet wheel mounted on said reel for rotation therewith, a pendulum support member disposed below said ratchet wheel and having a bore of circular cross-section extending therethrough, said bore having a reduced diameter portion at its bottom end and being cylindrical for the remainder of its length, a pendulum having a hemispherical operating member secured to the upper end thereof with the plain surface of said operating member uppermost, the operating member being disposed in the bore in said pendulum support member with its spherical surface in engagement with the reduced diameter portion of the bore to support the pendulum in such a manner that it can rotate through a limited angle in all directions about the centre of curvature of the hemisphere, a cylindrical plunger disposed in said bore and resting on the plain surface of said hemispherical operating member and having an upper end projecting above said pendulum support member, and a pawl pivotely mounted between said pendulum support member and said ratchet wheel in contact with said upper end of said plunger whereby displacement of said pendulum from the vertical causes said operating member to lift said plunger so that it moves said pawl into engagement with said ratchet wheel.

2. A device as claimed in claim 1, in which the ratchet wheel has teeth which are so shaped that, if said pawl is moved into engagement therewith and a torque is applied to said wheel in a direction such that the pawl inhibits rotation, the pawl is retained in engagement until said torque is removed.

3. A device as claimed in claim 2, including means for spring biasing said pawl out of engagement with said ratchet wheel.

4. An inertia reel device, comprising a housing, a reel disposed in said housing, a ratchet wheel mounted on said reel for rotation therewith, a pendulum support member mounted in said housing below said reel in such manner as to be capable of pivotal movement through a limited range about an axis parallel to that of the reel, said pendulum support member having a bore of circular cross section which is vertical when said support member is in the centre of its range of pivotal movement, said bore having a portion of reduced diameter adjacent to the lower end thereof and being cylindrical for the remainder of its length, a pendulum having a hemispherical operating member secured to the upper end of the pendulum with the plane surface of said operating member uppermost, the hemispherical operating member being disposed in said bore in engagement with the reduced diameter portion thereof, whereby the pendulum is supported so that it can rotate through a limited angle in all directions about the centre of curvature of the hemispherical operating member, a cylindrical plunger disposed in said bore and supported on the plane surface of said hemispherical operating member with an upper end projecting above the pendulum support member, and a pawl pivotally mounted between the pendulum support member and the ratchet wheel and resting on the upper end of said plunger whereby displacement of the pendulum from the vertical causes the operating member to lift the plunger so that it moves the pawl into engagement with the ratchet wheel.

5. A device as claimed in claim 4, including an indicating member mounted on said pendulum support member and projecting through an aperture in the housing providing an indication of the orientation of the operating member.

References Cited

UNITED STATES PATENTS

| 2,650,655 | 9/1953 | Neahr et al. | 242—107.4 XR |
|---|---|---|---|
| 3,203,641 | 8/1965 | McFarlane et al. | 242—107.4 |
| 3,226,053 | 12/1965 | Petty | 242—107.4 |
| 3,240,510 | 3/1966 | Spouge | 242—107.4 XR |
| 3,343,765 | 9/1967 | Baker | 242—107.4 |
| 3,395,873 | 8/1968 | Norris | 242—107.4 |

FOREIGN PATENTS 1,018,955    2/1966    Great Britain.

STANLEY N. GILREATH, Primary Examiner

W. H. SCHROEDER, Assistant Examiner